US012113292B2

(12) United States Patent
Kanasaki et al.

(10) Patent No.: US 12,113,292 B2
(45) Date of Patent: Oct. 8, 2024

(54) ANTENNA DEVICE

(71) Applicant: Panasonic Intellectual Property Management Co., Ltd., Osaka (JP)

(72) Inventors: Yoshihiro Kanasaki, Ishikawa (JP); Takahiro Ochi, Miyagi (JP); Kazuya Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 17/877,894

(22) Filed: Jul. 30, 2022

(65) Prior Publication Data

US 2022/0368035 A1 Nov. 17, 2022

Related U.S. Application Data

(63) Continuation of application No. PCT/JP2021/003185, filed on Jan. 29, 2021.

(30) Foreign Application Priority Data

Feb. 13, 2020 (JP) ................................ 2020-022355

(51) Int. Cl.

*H01Q 21/28* (2006.01)
*H01Q 9/04* (2006.01)
*H01Q 9/30* (2006.01)

(52) U.S. Cl.

CPC ........... *H01Q 21/28* (2013.01); *H01Q 9/0421* (2013.01); *H01Q 9/30* (2013.01)

(58) Field of Classification Search

CPC ........ H01Q 21/28; H01Q 9/0421; H01Q 9/30; H01Q 1/2266; H01Q 1/521; H01Q 5/35; H01Q 5/378; H01Q 9/42

See application file for complete search history.

(56) References Cited

U.S. PATENT DOCUMENTS 6,873,291 B2 * 3/2005 Aoyama .................. H01Q 1/38 343/702
7,196,664 B2 * 3/2007 Asai ......................... H01Q 1/38 343/702

(Continued)

FOREIGN PATENT DOCUMENTS

JP 2005-167762 A 6/2005
JP 2011-120071 A 6/2011
JP 2015-084604 A 4/2015

OTHER PUBLICATIONS

International Search Report for corresponding Application No. PCT/JP2021/003185, mailed Apr. 27, 2021.

(Continued)

*Primary Examiner* — Hai V Tran
*Assistant Examiner* — Michael M Bouizza
(74) *Attorney, Agent, or Firm* — Renner, Otto, Boisselle & Sklar, LLP

(57) ABSTRACT

An antenna device is disposed on a first, a second, and a third surfaces, and includes a first antenna disposed on the first and the third surfaces, a second antenna disposed on the second surface, and a ground line disposed on the first surface. The first antenna includes a first feedpoint disposed on the first surface, a first element disposed on the first surface, and extending from the first feedpoint to the third surface, and a second element disposed on the third surface, and extending in a direction along the first surface from an end of the first element. The second antenna includes a second feedpoint disposed in a manner separated from the first feedpoint in a direction parallel with the first and the second surfaces, and an antenna element extending from the second feedpoint. The ground line includes a ground line element capacitively coupled to the first antenna.

7 Claims, 11 Drawing Sheets

(56) References Cited

U.S. PATENT DOCUMENTS

| | | | | |
|---|---|---|---|---|
| 2003/0214441 | A1 | 11/2003 | Back et al. | |
| 2005/0134510 | A1 | 6/2005 | Asai | |
| 2009/0079639 | A1* | 3/2009 | Hotta | H01Q 5/378 343/702 |
| 2009/0174611 | A1* | 7/2009 | Schlub | H01Q 9/0407 343/702 |
| 2012/0013511 | A1 | 1/2012 | Sumi et al. | |
| 2012/0146865 | A1 | 6/2012 | Hayashi et al. | |
| 2013/0314297 | A1* | 11/2013 | Hamabe | H01Q 1/521 343/893 |
| 2017/0187412 | A1* | 6/2017 | Han | H04B 1/40 |
| 2018/0277951 | A1 | 9/2018 | Nishikawa et al. | |

OTHER PUBLICATIONS

English Translation of Chinese Office Action dated May 31, 2024 for the related Chinese Patent Application No. 202180012482.0.

* cited by examiner

ANTENNA DEVICE

BACKGROUND

1. Technical Field

The present disclosure relates to an antenna device.

2. Description of the Related Art

Conventionally, an antenna device supporting multiple bands has been known (see Patent Literature (PTL) 1, for example). The antenna device disclosed in PTL 1 includes a first antenna element that is connected to a first feed unit, a second antenna element that resonates in a frequency band different from that of the first antenna element and that is connected to a second feeding unit, and a ground line that is selectively connected to one of two different reactance elements via a switch. In the antenna device described in PTL 1, an attempt for improving the antenna efficiency in each frequency band is made by switching the reactance element (i.e., the reactance value) to be connected to the ground line.

PTL 1 is Unexamined Japanese Patent Publication No. 2011-120071.

SUMMARY

The present disclosure provides an antenna device including two antennas, the antenna device being capable of achieving a reduction in size, while ensuring isolation between the two antennas.

An antenna device according to one aspect of the present disclosure is disposed on a first surface, a second surface parallel with the first surface, and a third surface connecting the first surface and the second surface and perpendicular to the first surface and to the second surface, and includes a first antenna disposed on the first surface and the third surface, a second antenna disposed on the second surface, and a ground line disposed on the first surface. The first antenna includes a first feedpoint disposed on the first surface, a first element, the first element being conductive, being disposed on the first surface, and extending from the first feedpoint to the third surface, and a second element, the second element being conductive, being disposed on the third surface, and extending in a direction along the first surface from an end of the first element. The second antenna includes a second feedpoint disposed in a manner separated from the first feedpoint in a direction parallel with the first surface and the second surface, and an antenna element the antenna element being conductive and extending from the second feedpoint. The ground line includes a ground point grounded and a ground line element, the ground line element being conductive, being connected to the ground point, including a portion extending in a direction along the first antenna, and being capacitively coupled to the first antenna.

According to the present disclosure, it is possible to provide an antenna device including two antennas, the antenna device being capable of achieving a reduction in size, while ensuring isolation between the two antennas.

DETAILED DESCRIPTION

Figure 1:
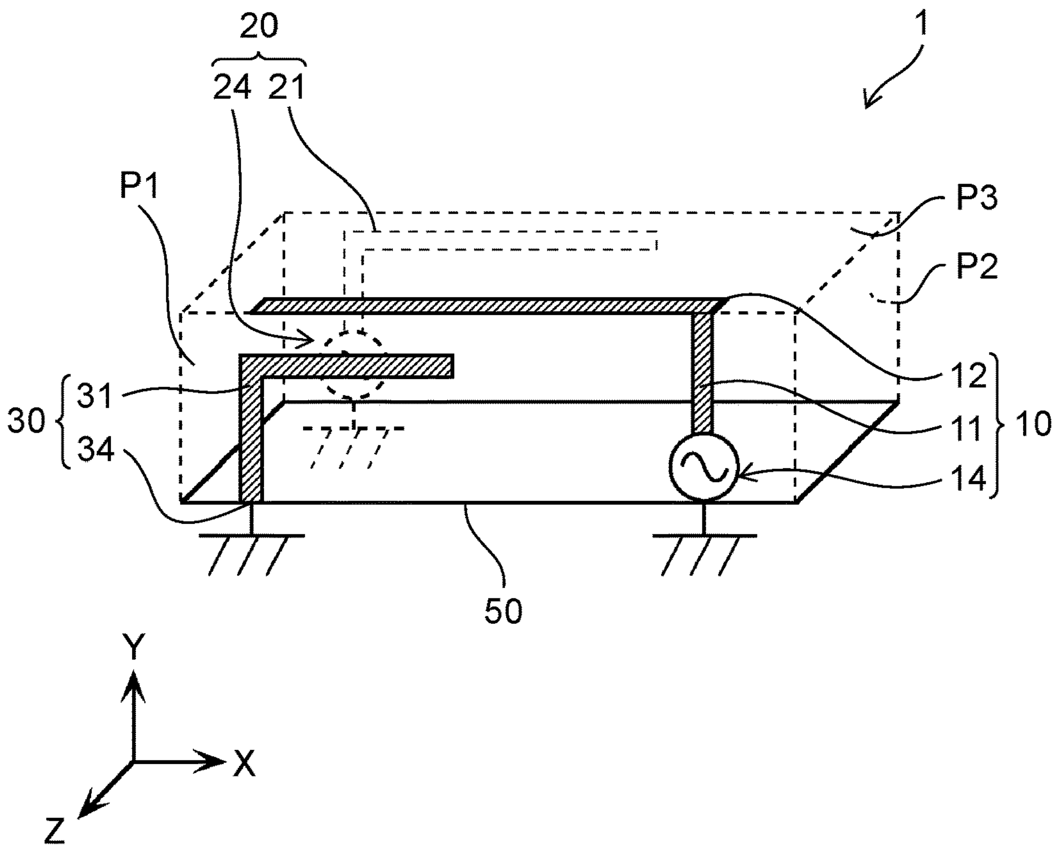
FIG. 1 is a schematic diagram illustrating an overall configuration of an antenna device according to a first exemplary embodiment.

Some exemplary embodiments will now be explained specifically with reference to some drawings.

Note that the exemplary embodiments described below are intended to provide comprehensive or specific examples of the present disclosure. Numerical values, shapes, materials, components, arrangement positions and connection configurations of the components, steps, processing order of the steps, and the like described in the following exemplary embodiments are merely some examples, and are not intended to limit the present disclosure.

These drawings are schematic representations, and are not necessarily precisely illustrated. In the drawings, identical reference marks are given to the identical elements.

First Exemplary Embodiment

An antenna device according to a first exemplary embodiment will now be explained.

[1-1. Overall Configuration]

To begin with, an overall configuration of the antenna device according to the first exemplary embodiment will be explained with reference to FIGS. 1 to 4. FIG. 1 is a schematic diagram illustrating the overall configuration of antenna device 1 according to the present exemplary embodiment. In FIG. 1, a perspective view of antenna device 1 as viewed from the side of first surface P1 is provided.

Figure 2:
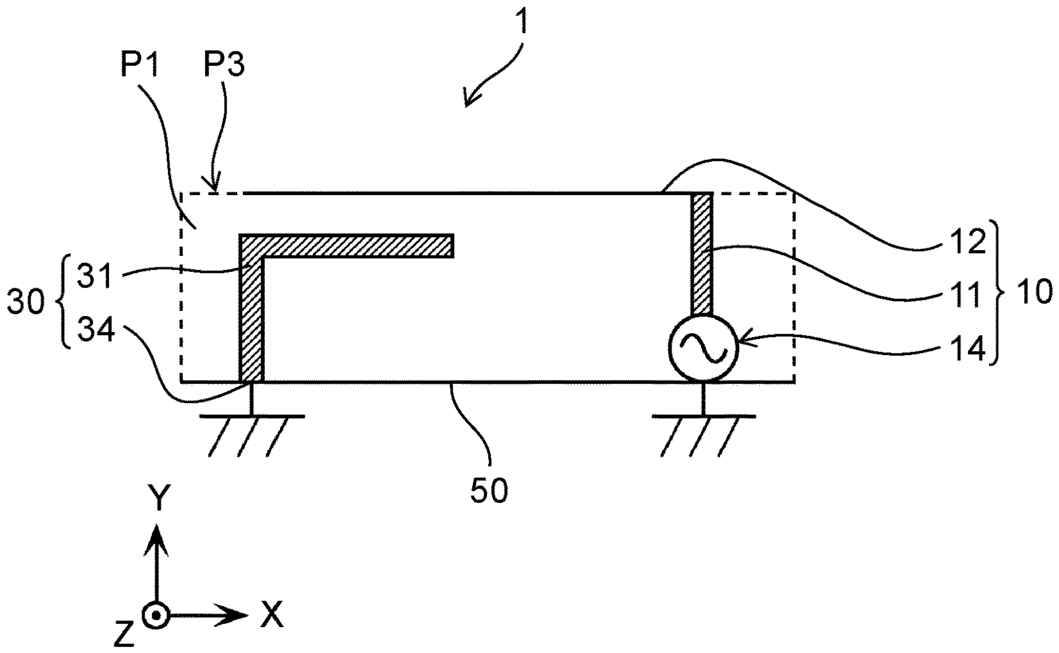
FIG. 2 is a schematic plan view of a first surface of the antenna device according to the first exemplary embodiment.
Figure 3:
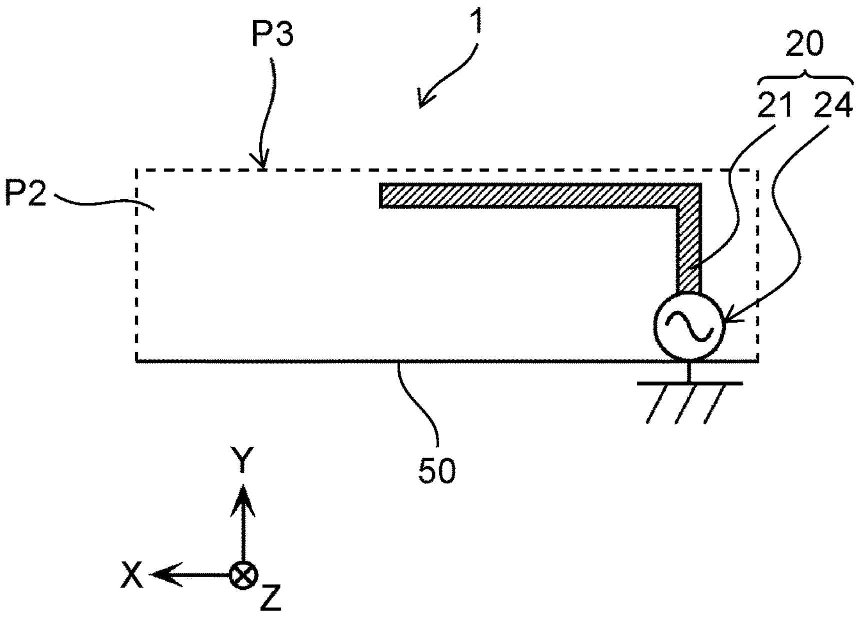
FIG. 3 is a schematic plan view of a second surface of the antenna device according to the first exemplary embodiment.
Figure 4:
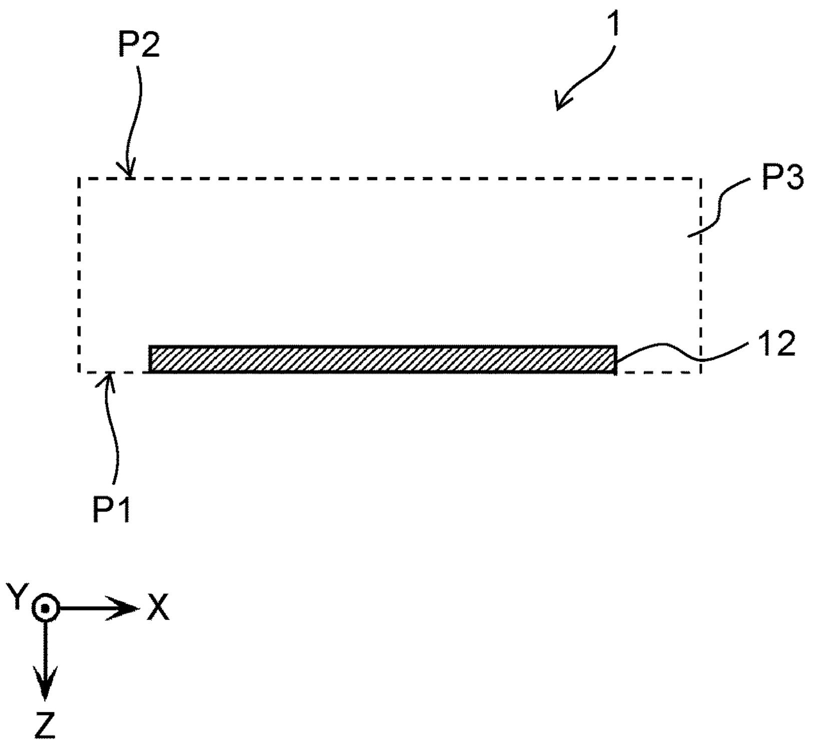
FIG. 4 is a schematic plan view of a third surface of the antenna device according to the first exemplary embodiment.

FIGS. 2, 3, and 4 are schematic plan views of first surface P1, second surface P2, and third surface P3 of antenna device 1 according to the present exemplary embodiment, respectively.

Antenna device 1 is a wireless communication device that transmits and receives a signal in a first frequency band and a signal in a second frequency band. The first frequency band and the second frequency band are not limited to particular frequency bands. In the present exemplary embodiment, the first frequency band is a band including the second frequency band. Specifically, the first frequency band is a band in a range between 1.2 GHz and 6 GHz inclusive, and the second frequency band is a band in a range between 2.4 GHz and 6 GHz inclusive. As illustrated in FIG. 1, antenna device 1 is disposed on ground member 50 that is a grounded conductive member. Ground member 50 is not limited to a particular member, but is, for example, a frame of a terminal in which antenna device 1 is disposed. Ground member 50 is made of a conductive metal such as magnesium, for example.

As illustrated in FIG. 1, antenna device 1 is disposed on first surface P1, second surface P2, and third surface P3. Second surface P2 is a surface that is parallel with first surface P1. Third surface P3 is a plane connecting first surface P1 and second surface P2, and is perpendicular to first surface P1 and second surface P2. The expression being "parallel" herein means not only being perfectly parallel but also being substantially parallel. Specifically, an arrangement in which one surface is inclined from another surface by an angle less than or equal to 10° or so, with respect to the arrangement in which these surfaces are perfectly in parallel with each other, is also referred to as being "parallel". The expression being "perpendicular" means not only being perfectly perpendicular but also being substantially perpendicular. Specifically, an arrangement in which one surface is inclined from another surface by an angle less than or equal to 10° or so, with respect to an arrangement in which these surfaces are perfectly perpendicular to each other, is also referred to as being "perpendicular".

Antenna device 1 includes first antenna 10, second antenna 20, and ground line 30. Antenna device 1 is disposed on an insulating substrate having first surface P1, second surface P2, and third surface P3 (the insulating substrate is not illustrated), for example. As the insulating substrate, a flexible printed circuit (FPC) substrate, may be used, for example. When a flexible insulating substrate such as a flexible printed circuit board is used, the insulating substrate may be disposed on a holder made of an insulating material such as resin. In this manner, the shape of insulating substrate can be stabilized.

First antenna 10 is an antenna resonating in the first frequency band. As illustrated in FIGS. 1, 2, and 4, first antenna 10 is disposed across first surface P1 and third surface P3. First antenna 10 includes first feedpoint 14, first element 11, and second element 12. An electrical length of first antenna 10, that is, an electrical length of a combination of first element 11 and second element 12 is about ⅛ of the wavelength corresponding to the first frequency band. In the present exemplary embodiment, an electrical length of first antenna 10 is 31.25 mm that is ⅛ of the wavelength of 250 mm, corresponding to 1.2 GHz. Note that the wavelength includes an effective wavelength (the wavelength taking the wavelength reduced by the dielectric body around the antenna element into consideration). First antenna 10 may be used as, for example, an antenna for a wide-area data communication network, such as a mobile phone communication network, utilized in wireless communication.

As illustrated in FIGS. 1 and 2, first feedpoint 14 is a feedpoint disposed on first surface P1, and the signals in the first frequency band are supplied to first feedpoint 14. Specifically, the signals in the first frequency band are supplied to first feedpoint 14 via a coaxial cable, a feed pin, or the like. When a coaxial cable is used, an inner conductor of the coaxial cable is connected to first feedpoint 14, and an outer conductor of the coaxial cable is connected to ground member 50.

As illustrated in FIGS. 1 and 2, first element 11 is a conductive element disposed on first surface P1 and extending from first feedpoint 14 to third surface P3. In the present exemplary embodiment, first element 11 extends from first feedpoint 14 in a direction perpendicular to third surface P3.

As illustrated in FIGS. 1, 2, and 4, second element 12 is a conductive element disposed on third surface P3 and extending from an end of first element 11 (that is, a far end of first element 11, the far end being far from first feedpoint 14), along first surface P1. In the present exemplary embodiment, second element 12 has an elongated shape extending from the end of first element 11 in a direction parallel to first surface P1.

Second antenna 20 is an antenna resonating in the second frequency band. As illustrated in FIGS. 1 and 3, second antenna 20 is disposed on second surface P2. Second antenna 20 includes second feedpoint 24 and antenna element 21. An electrical length of second antenna 20 is about ¼ of the wavelength corresponding to the second frequency band. In the present exemplary embodiment, an electrical length of second antenna 20 is 31.25 mm, which is ¼ of a wavelength of 125 mm corresponding to 2.4 GHz. For example, second antenna 20 may be used as an antenna that resonates in 2.4 GHz band and 5 GHz band for wireless local area network (LAN).

Second feedpoint 24 is a feedpoint disposed on second surface P2, and the signals in the second frequency band are supplied to second feedpoint 24. Second feedpoint 24 is disposed in a manner separated from first feedpoint 14 in a direction parallel with first surface P1 and second surface P2. Specifically, the signals in the second frequency band are supplied to second feedpoint 24 via a coaxial cable, a feed pin, or the like. When a coaxial cable is used, an inner conductor of the coaxial cable is connected to second feedpoint 24, and an outer conductor of the coaxial cable is connected to ground member 50. Second feedpoint 24 may be disposed at a position as far as possible from first feedpoint 14. In this manner, interference between the signals supplied to first feedpoint 14 and the signals supplied to second feedpoint 24 can be reduced. In the present exemplary embodiment, second feedpoint 24 is disposed in a manner separated from first feedpoint 14 in a direction parallel with first surface P1 and second surface P2 (that is, in the X axis direction).

The distance between first surface P1 and second surface P2 is less than or equal to 1/10 of the wavelength corresponding to the resonance frequency band of the first antenna 10.

As illustrated in FIGS. 1 and 3, antenna element 21 is a conductive element disposed on second surface P2 and extending from second feedpoint 24. In the present exemplary embodiment, antenna element 21 has an L shape. Specifically, antenna element 21 has one portion extending from second feedpoint 24 in a direction intersecting with third surface P3, and another portion extending along third surface P3, from a far end of the one portion, the far end being far from second feedpoint 24. In the present exemplary embodiment, among the portions of antenna element 21, the portion extending from second feedpoint 24 in a direction intersecting with third surface P3 extends from second feedpoint 24 in a direction perpendicular to third surface P3.

Ground line 30 is a conductive element to be grounded, and is disposed on first surface P1 as illustrated in FIGS. 1 and 2. Ground line 30 includes ground point 34 and ground line element 31.

Ground point 34 is connected to the ground member 50 to be grounded.

Ground line element 31 is a conductive element that is connected to ground point 34, includes a portion extending in a direction along first antenna 10, and is capacitively coupled to first antenna 10. In the present exemplary embodiment, ground line element 31 has an L shape. Specifically, ground line element 31 includes one portion extending from ground point 34 in a direction intersecting with third surface P3, and another portion extending along third surface P3, from a far end of the one portion, the far end being far from ground point 34. In the present exemplary embodiment, among the portions of ground line element 31, the portion extending from ground point 34 in the direction intersecting with third surface P3 extends from ground point 34 in a direction perpendicular to third surface P3.

Among the portions of ground line element 31, at least a part of the portion extending along third surface P3 extends in a direction along second element 12 of first antenna 10. In this manner, ground line element 31 is capacitively coupled to first antenna 10. More specifically, among the portions of ground line element 31, at least a part of the portion extending along third surface P3 extends in a direction along the portion including an open end of second element 12 of first antenna 10. At this time, the electric field intensity corresponding to the signals in the first frequency band increases near the open end of second element 12. Therefore, because ground line element 31 extends in a direction along such a portion including the open end of second element 12, ground line element 31 can be capacitively coupled to second element 12 reliably.

Furthermore, when ground line element 31 and second element 12 of first antenna 10 are capacitively coupled to each other strongly at a distance near to each other, capacitive coupling between first antenna 10 and second antenna 20 is weakened, the second antenna 20 being disposed slightly away from first antenna 10 on second surface P2 that is different from the surface where ground line element 31 and second element 12 are disposed.

Furthermore, a distance between the portion of ground line element 31 extending in the direction along second element 12 and second element 12 is less than or equal to 1/100 of the wavelength corresponding to the resonance frequency band of first antenna 10. In this manner, ground line element 31 can be capacitively coupled to first antenna 10 reliably. Because ground line 30 is connected to ground member 50, a loop antenna is formed by first antenna 10, ground member 50, and ground line 30. This loop antenna will now be explained with reference to FIG. 5.

Figure 5:
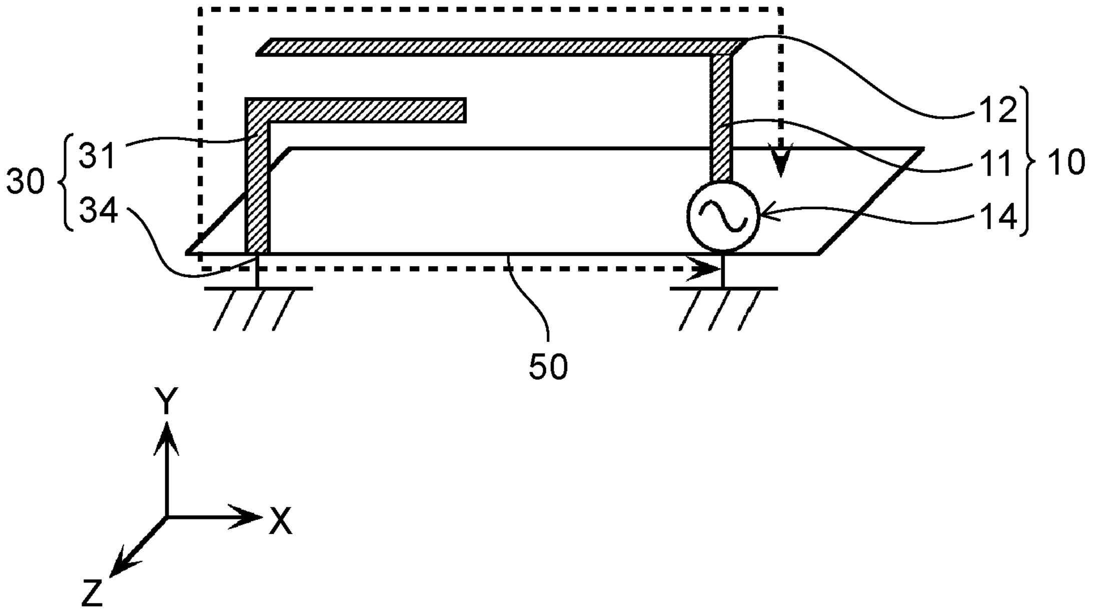
FIG. 5 is a schematic diagram illustrating a loop antenna formed in the first exemplary embodiment.

FIG. 5 is a schematic diagram illustrating a loop antenna formed in antenna device 1 according to the present exemplary embodiment. As indicated by arrows in broken lines in FIG. 5, in antenna device 1 according to the present exemplary embodiment, first antenna 10, ground line 30, and ground member 50 together form a loop antenna. By setting the electrical length of the loop antenna to such an electrical length that the loop antenna resonates in the resonance frequency band of first antenna 10 (that is, the first frequency band), it is possible to improve the antenna efficiency in the resonance frequency band of first antenna 10. In the present exemplary embodiment, the electrical length of the loop antenna is about 3/8 of the wavelength corresponding to the resonance frequency band of first antenna 10. More specifically, the electrical length of the loop antenna is 93.75 mm that is 3/8 of the wavelength of 250 mm corresponding to 1.2 GHz.

In addition, in the portion of ground line element 31 extending in the direction along second element 12, the direction from a near end of ground line element 31 toward the open end of ground line element 31 and the direction from a connected end of second element 12 toward the open end of second element 12, the near end being near ground point 34 and the connected end being connected to first element 11, are opposite to each other. Among the portions of ground line element 31, the open end of ground line element 31 herein is a far end that is far from the ground point, and the open end of second element 12 is a far end of second element 12, being far from first element 11.

The electrical length of ground line element 31 is not limited to a particular length, but is about 1/4 of the wavelength corresponding to the second frequency band, in the present exemplary embodiment. More specifically, the electrical length of ground line element 31 is 31.25 mm that is 1/4 of a wavelength of 125 mm corresponding to 2.4 GHz.

In the present exemplary embodiment, ground line 30 is disposed at a position facing second antenna 20. In addition, ground line element 31 includes a portion extending along the direction in which antenna element 21 of second antenna 20 extends. Specifically, ground line element 31 includes a portion extending in a direction intersecting with third surface P3 and a portion extending along third surface P3.

Each element of first element 11 and second element 12 of first antenna 10, antenna element 21 of second antenna 20, and ground line element 31 of ground line 30 is formed using a metal such as Cu, Al, or Au, or an alloy containing a plurality of metals, for example. As each of such elements, printed wiring disposed on an insulating substrate may be used, for example. Note that the configuration of each of these elements is not limited to the example explained herein. As each of these elements, for example, a rod-like, plate-like, or sheet-like conductive member may be used. A method of manufacturing each of such elements is not limited to a particular method, and such an element may be made from a sheet metal, or may be made by plating, vapor deposition, or laser direct structuring (LDS), for example.

[1-2. Action and Advantageous Effects]

An action and advantageous effects achieved by antenna device 1 according to the present exemplary embodiment will now be explained. To begin with, a structural effect achieved by antenna device 1 according to the present exemplary embodiment will be explained. As illustrated in FIG. 1, for example, in antenna device 1 according to the present exemplary embodiment, the antennas and ground line 30 are arranged three-dimensionally in a manner distributed across first surface P1, second surface P2, and third surface P3, so that reduction in size can be achieved, as compared with a configuration in which the antennas and ground line 30 are arranged on a plane. In the present exemplary embodiment, it is possible to bring the shortest distance between first antenna 10 and second antenna 20 to about 1/20 of the wavelength corresponding to the second frequency band. When the 2.4 GHz band is used as the second frequency band, it is possible to set the shortest distance between first antenna 10 and second antenna 20 to about 6 mm.

Furthermore, in antenna device 1 according to the present exemplary embodiment, by disposing a part of first antenna 10 on third surface P3, it is possible to ensure the electrical length of first antenna 10 while avoiding structural interference between first antenna 10 and ground line 30 disposed on first surface P1. By disposing second antenna 20 on second surface P2, it is possible to ensure the electrical length of second antenna 20 while avoiding structural interference between second antenna 20, and first antenna 10 and ground line 30.

Figure 6:
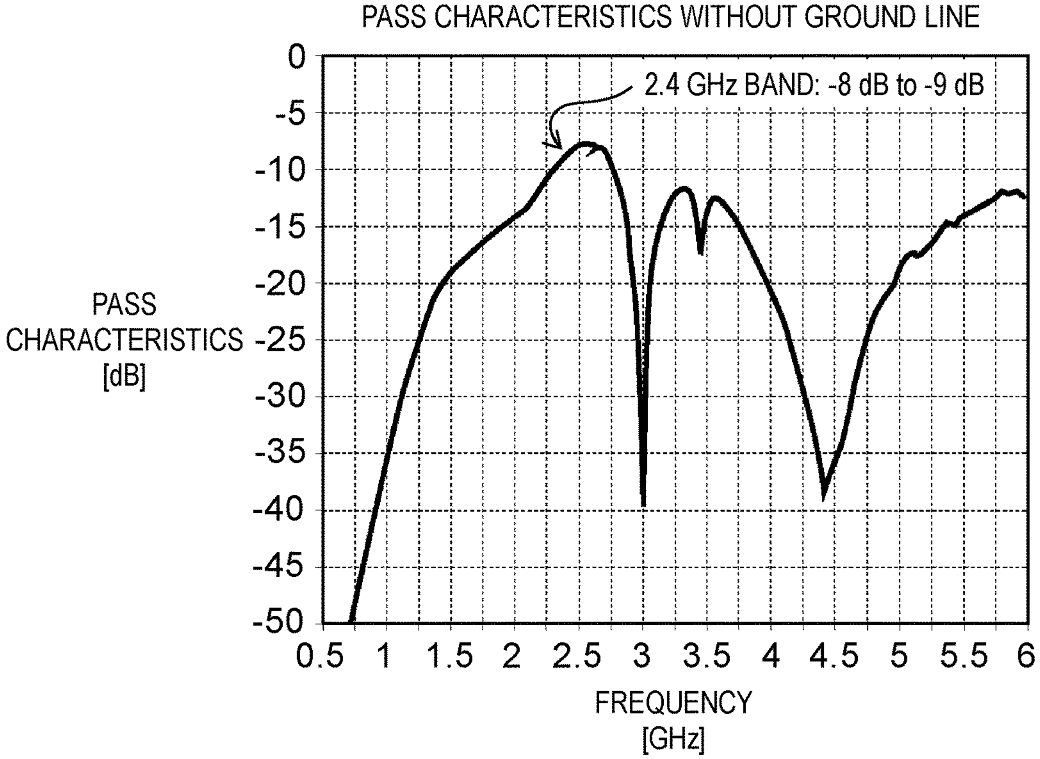
FIG. 6 is a graph illustrating a result of simulating pass characteristics of an antenna device according to a comparative example.
Figure 7:
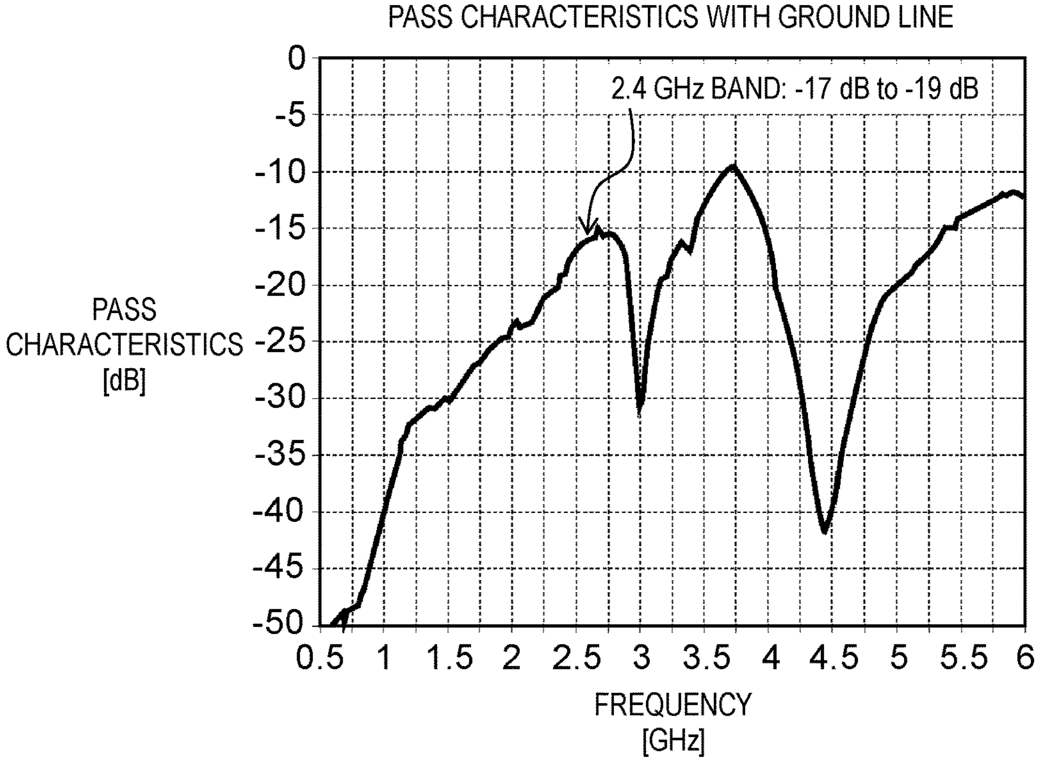
FIG. 7 is a graph illustrating a result of simulating pass characteristics of an antenna device according to the first exemplary embodiment.

Isolation characteristics of first antenna 10 and second antenna 20 included in antenna device 1 according to the present exemplary embodiment will now be explained with reference to FIGS. 6 and 7, using a comparison with a comparative example. FIGS. 6 and 7 are graphs illustrating results of simulating pass characteristics of the antenna device according to the comparative example and the present exemplary embodiment, respectively. Referring to FIGS. 6 and 7, the abscissa represents pass characteristics, and the ordinate represents frequency. The pass characteristic illustrated in FIGS. 6 and 7 is an index indicating a ratio of the signals applied to first antenna 10 pass through to second antenna 20. In other words, a lower pass characteristic indicates a better isolation characteristic.

The antenna device according to the comparative example is different from antenna device 1 according to the present exemplary embodiment in that ground line 30 is not provided, but other parts are the same.

In the antenna device according to the comparative example illustrated in FIG. 6, the pass characteristics are about −8 dB to −9 dB in the 2.4 GHz band that is the resonance frequency band of both first antenna 10 and second antenna 20. In the antenna device according to the comparative example, first antenna 10 and second antenna 20 share ground member 50 that functions as a ground, and a distance between these two antennas is small. Accordingly, the electromagnetic waves at which these two antennas resonate are coupled via the ground member 50. Therefore, sufficient isolation between these two antennas cannot be ensured.

By contrast, in antenna device 1 according to the present exemplary embodiment illustrated in FIG. 7, the pass characteristics are about −17 dB to −19 dB. In other words, the isolation characteristics in the 2.4 GHz band are improved in antenna device 1 according to the present exemplary embodiment as compared with the antenna device according to the comparative example. The degree of the isolation characteristic required in a wireless communication device depends on the specification of the device, but the pass characteristic lower than or equal to −10 dB are generally required. The antenna device 1 according to the present exemplary embodiment can satisfy specifications of such a general isolation characteristic requirement.

The isolation characteristics in antenna device 1 according to the present exemplary embodiment is improved because ground line 30 affects the radiation directivities of first antenna 10 and second antenna 20. Specifically, the positional relationship and the like between ground line 30 and first antenna 10 are different from those between ground line 30 and second antenna 20. Therefore, ground line 30 affects the radiation directivities of first antenna 10 and second antenna 20 differently. Accordingly, the similarity between the radiation directivities of first antenna 10 and second antenna 20 is reduced. Therefore, the coupling efficiency between first antenna 10 and second antenna 20 is reduced. Hence, the isolation characteristics between first antenna 10 and second antenna 20 are expected to improve.

Figure 8:
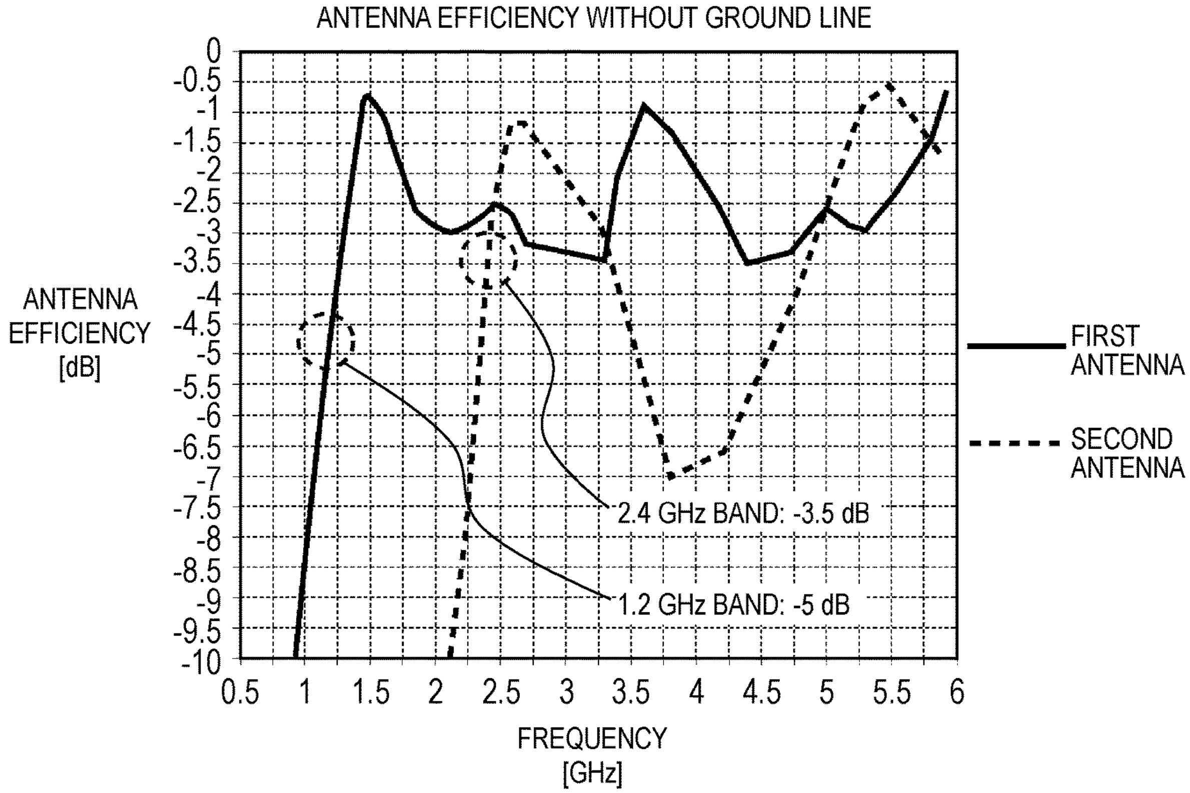
FIG. 8 is a graph illustrating a result of simulating pass characteristics of an antenna device according to a comparative example.
Figure 9:
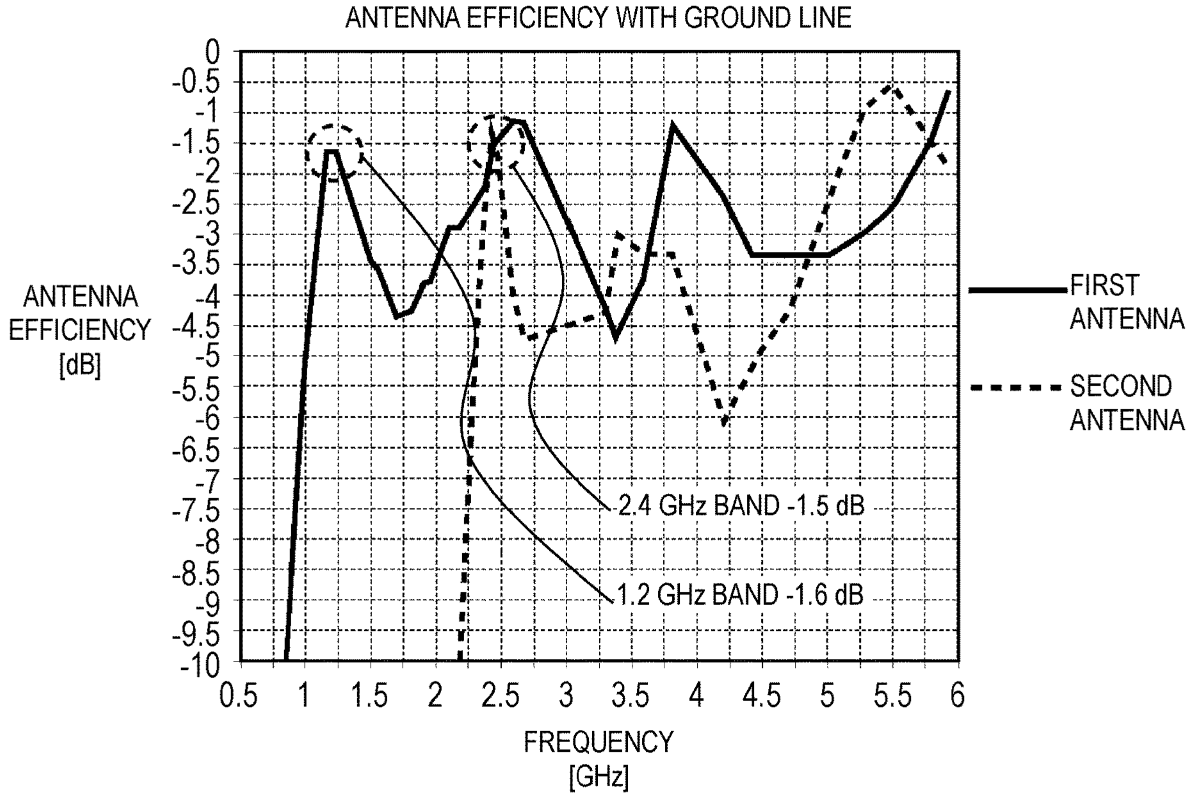
FIG. 9 is a graph illustrating a result of simulating an antenna efficiency of the antenna device according to the first exemplary embodiment.

The antenna efficiencies of first antenna 10 and second antenna 20 of antenna device 1 according to the present exemplary embodiment will now be explained with reference to FIGS. 8 and 9, by comparing with the comparative example explained above. FIGS. 8 and 9 are graphs illustrating results of simulating antenna efficiencies of the antenna device according to the comparative example and of the antenna device according to the present exemplary embodiment, respectively. The curves in a solid line and a dotted line in FIGS. 8 and 9 indicate antenna efficiencies of first antenna 10 and second antenna 20, respectively. In FIGS. 8 and 9, the abscissa represents antenna efficiency, and the ordinate represents frequency. The antenna efficiency indicated in FIGS. 8 and 9 represents a ratio of a radiated power with respect to a power supplied to the antenna.

As illustrated in FIGS. 8 and 9, in the 1.2 GHz band, the antenna efficiency of first antenna 10 according to the comparative example is about −5 dB, whereas the antenna efficiency of first antenna 10 in antenna device 1 according to the present exemplary embodiment is about −1.6 dB. This is because the resonance frequency of the first antenna has been dropped from 1.5 GHz to 1.2 GHz, and this is because first antenna 10 according to the present exemplary embodiment forms a loop antenna, together with ground line 30 and ground member 50, that resonates in the 1.2 GHz band.

In other words, in the present exemplary embodiment, because not only the isolation between first antenna 10 and second antenna 20 is improved, but also such a loop antenna is configured at the same time, it is possible to lower the frequency of the first antenna (that is, to achieve a reduction in the size of the antenna). As described above, in antenna device 1 according to the present exemplary embodiment, the antenna efficiency of first antenna 10 in the 1.2 GHz band can be improved, compared with that of the antenna device according to the comparative example.

As illustrated in FIGS. 8 and 9, in the 2.4 GHz band, the antenna efficiency of second antenna 20 according to the comparative example is about −3.5 dB, whereas the antenna efficiency of second antenna 20 in antenna device 1 according to the present exemplary embodiment is about −1.5 dB. In this manner, in antenna device 1 according to the present exemplary embodiment, the antenna efficiency of second antenna 20 in the 2.4 GHz band is improved, compared with that of the antenna device according to the comparative example. It can be presumed that this is because the electrical length of ground line 30 according to the present exemplary embodiment is about ¼ of the wavelength corresponding to the 2.4 GHz band that is the second frequency band, and therefore, ground line 30 resonates with a signal in the 2.4 GHz band. In other words, presumably, in the present exemplary embodiment, not only second antenna 20 but also ground line 30 contribute to the radiation of signals in the 2.4 GHz band.

In the manner described above, according to the present exemplary embodiment, it is possible to provide antenna device 1 including first antenna 10 and second antenna 20, the antenna device being capable of achieving a size reduction while ensuring isolation between these antennas. Furthermore, according to the present exemplary embodiment, the antenna efficiency of each antenna of antenna device 1 can also be improved. As described above, in the present exemplary embodiment, the antenna efficiency of each antenna can be improved while ensuring isolation between two antennas.

Furthermore, in the present exemplary embodiment, because ground line 30 is disposed at a position facing second antenna 20, second feedpoint 24 and ground point 34 are brought near each other, so that coupling efficiency between second antenna 20 and ground line 30 can be improved. Therefore, the radiation efficiency of ground line 30 in the 2.4 GHz band can be improved. Furthermore, because ground line 30 includes a portion extending along the direction in which antenna element 21 of second antenna 20 extends, it is possible to dispose ground line 30 in a limited space, and to reduce the size of the antenna.

Second Exemplary Embodiment

An antenna device and a communication terminal including the antenna device according to a second exemplary embodiment will now be explained. The antenna device according to the present exemplary embodiment is different from antenna device 1 according to the first exemplary embodiment mainly in that each of the first antenna and the second antenna includes a short-circuit line. Hereinafter, the antenna device and the communication terminal according to the present exemplary embodiment will be explained with reference to FIGS. 10 to 14, but descriptions of the configurations that are shared with antenna device 1 according to the first exemplary embodiment will be partly omitted.

Figure 10:
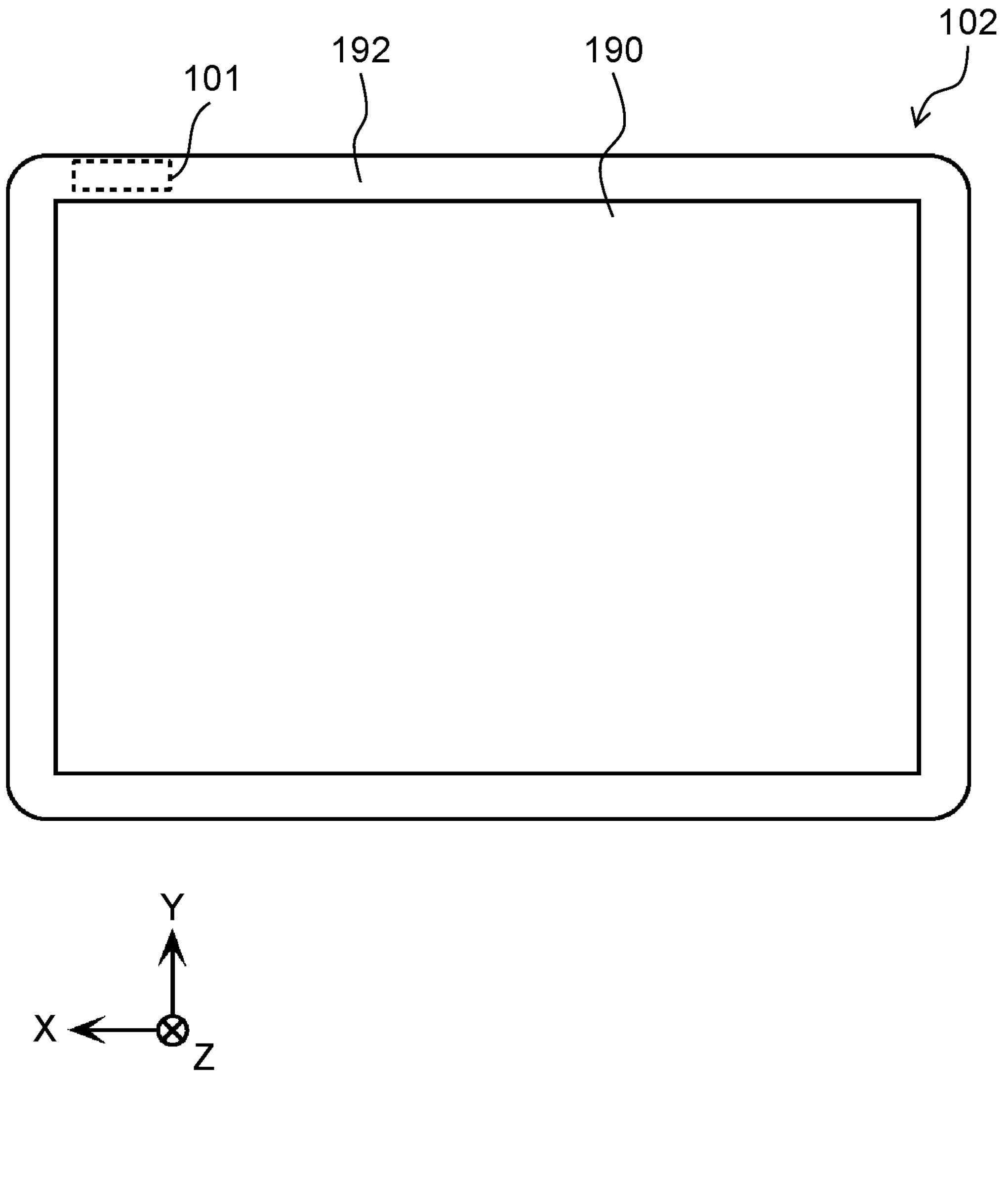
FIG. 10 is a schematic diagram illustrating an outer appearance of a communication terminal according to a second exemplary embodiment.

FIG. 10 is a schematic diagram illustrating an outer appearance of communication terminal 102 according to the present exemplary embodiment. Communication terminal 102 according to the present exemplary embodiment is a terminal that performs wireless communication, and includes antenna device 101, as illustrated in FIG. 10. Communication terminal 102 also includes display 190 and housing 192. Communication terminal 102 is a tablet terminal, for example.

Display 190 is a monitor that displays an image on the communication terminal 102. As display 190, for example, a liquid crystal display panel, an organic electro-luminescence (EL) display panel, or the like may be used.

Housing 192 is an enclosure in which antenna device 101, other circuits, and components included in communication terminal 102 are housed. Housing 192 is made of an insulating material such as resin, at least around antenna device 101. In this manner, the electromagnetic waves radiated from antenna device 101 are allowed to radiate outside of housing 192, and the electromagnetic waves becoming incident from the outside are allowed to pass through housing 192 and to propagate to antenna device 101.

Figure 11:
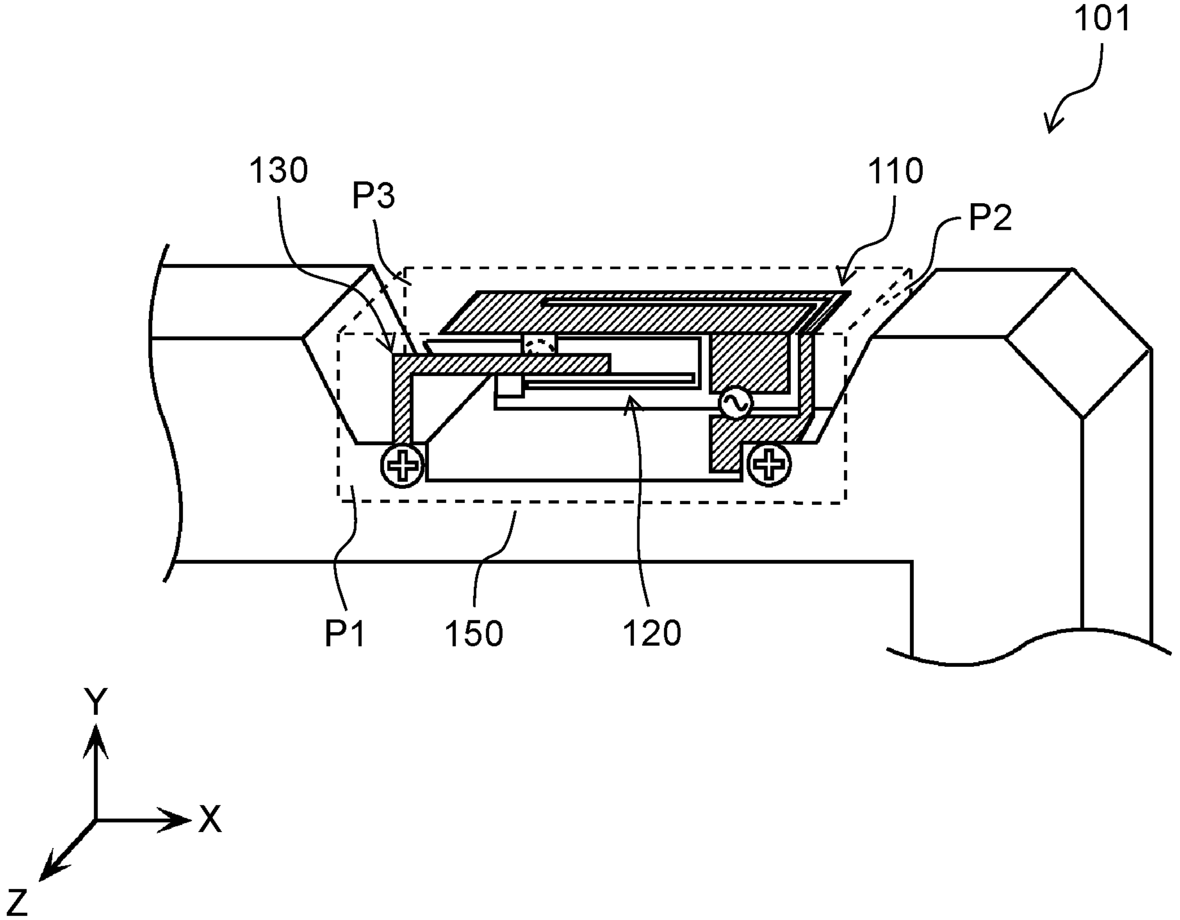
FIG. 11 is a schematic diagram illustrating an overall configuration of an antenna device according to the second exemplary embodiment.
Figure 12:
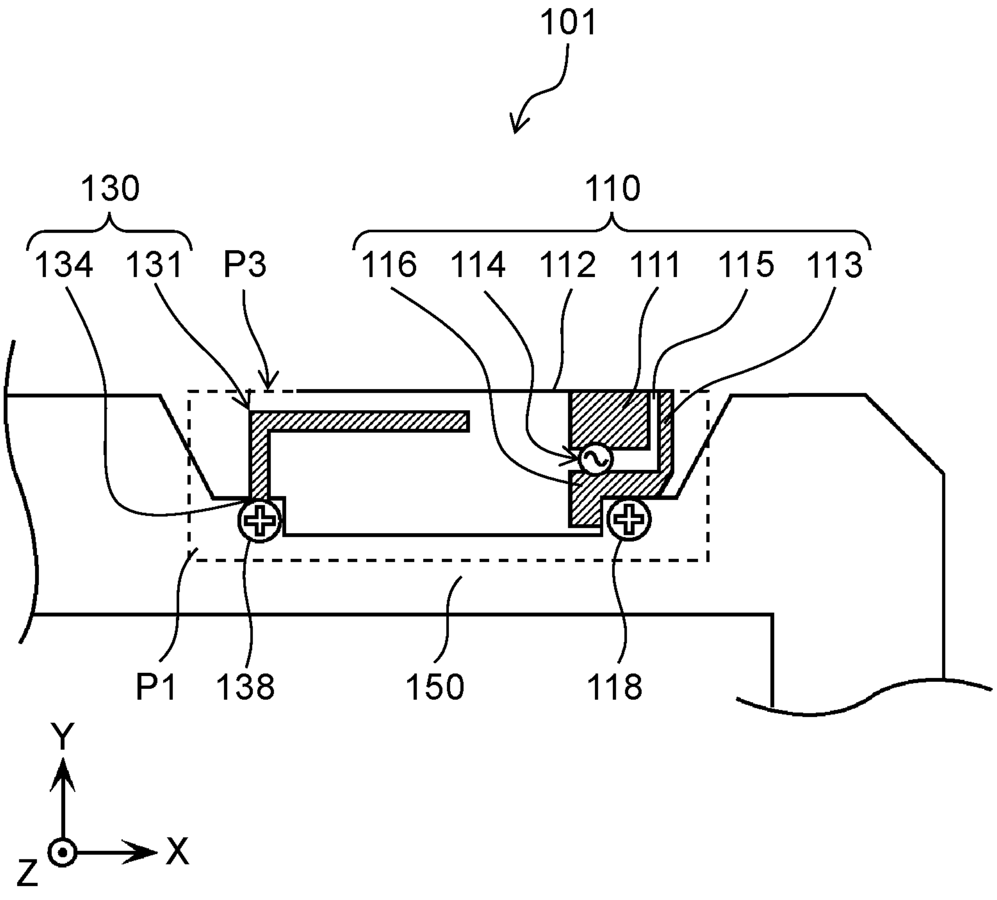
FIG. 12 is a schematic plan view of a first surface of the antenna device according to the second exemplary embodiment.
Figure 13:
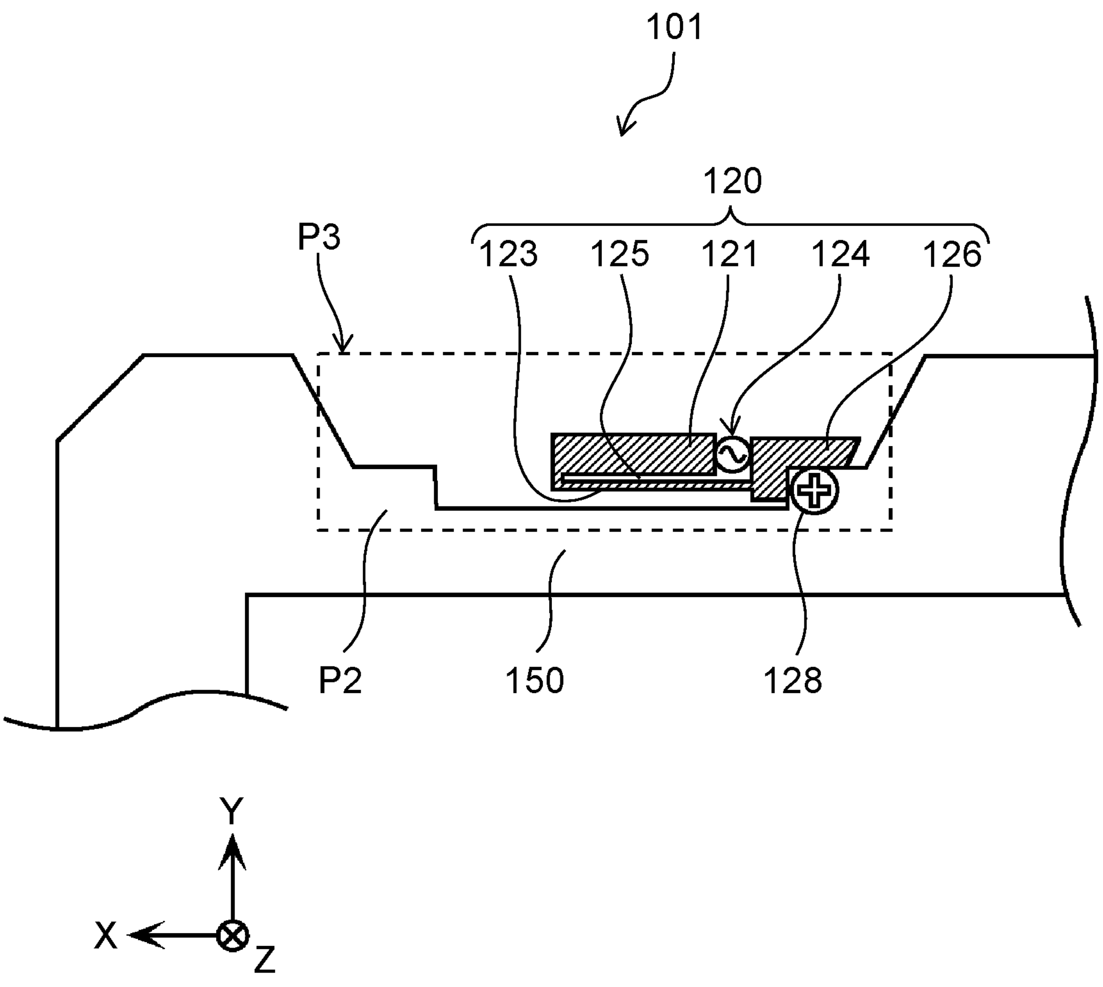
FIG. 13 is a schematic plan view of a second surface of the antenna device according to the second exemplary embodiment.
Figure 14:
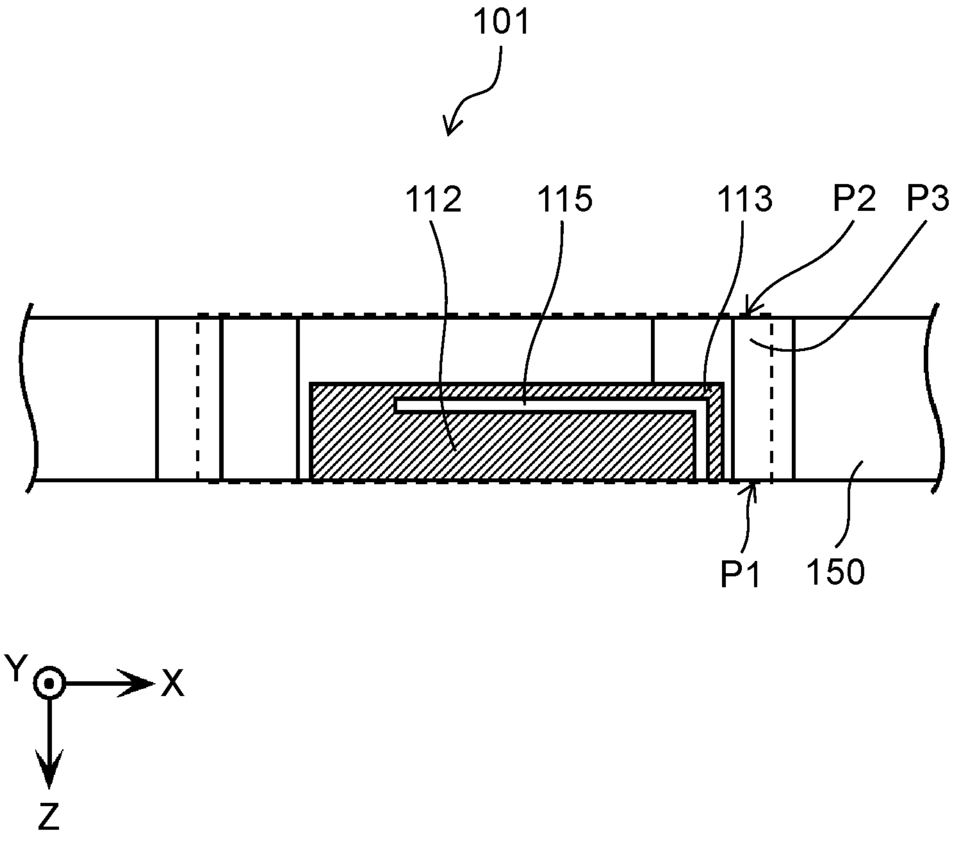
FIG. 14 is a schematic plan view of a third surface of the antenna device according to the second exemplary embodiment.

Antenna device 101 is a wireless communication device that transmits and receives signals in the first frequency band and the second frequency band, in the same manner as antenna device 1 according to the first exemplary embodiment. As illustrated in FIG. 10, antenna device 101 is disposed inside housing 192. Antenna device 101 according to the present exemplary embodiment will now be explained with reference to FIGS. 11 to 14. FIG. 11 is a schematic diagram illustrating the overall configuration of antenna device 101 according to the present exemplary embodiment. In FIG. 11, a perspective view of antenna device 101 as viewed from the side of first surface P1 is provided. FIGS. 12, 13, and 14 are schematic plan views of first surface P1, second surface P2, and third surface P3 of antenna device 101 according to the present exemplary embodiment, respectively. FIGS. 11 to 14 illustrate a configuration with the housing 192 removed from communication terminal 102. As illustrated in FIG. 11, antenna device 101 is disposed on ground member 150.

Ground member 150 is a conductive member that is grounded. In the present exemplary embodiment, ground member 150 is a member that functions as a frame of communication terminal 102. Antenna device 101 is disposed in and connected to a recess formed on an outer periphery of ground member 150. Ground member 150 is made of a conductive material. Ground member 150 is made of magnesium, for example.

As illustrated in FIG. 11, antenna device 101 according to the present exemplary embodiment is disposed on first surface P1, second surface P2 that is parallel with first surface P1, and third surface P3 that connects first surface P1 to second surface P2 and that is perpendicular to first surface P1 and second surface P2, and includes first antenna 110, second antenna 120, and ground line 130. Antenna device 101 is disposed on an insulating substrate having first surface P1, second surface P2, and third surface P3 (the insulating substrate is not illustrated), for example. Note that, in the present exemplary embodiment, first surface P1 is a surface disposed at a position nearer to a surface on the rear side of display 190 (that is, the rear surface of communication terminal 102) than to display 190 in communication terminal 102. In addition, second surface P2 is a surface disposed at a position nearer to display 190 than to the surface on the rear side of display 190 in communication terminal 102 (that is, the rear surface of communication terminal 102).

First antenna 110 is an antenna disposed on first surface P1 and third surface P3, and includes first feedpoint 114, first element 111, second element 112, first short-circuit element 113, first slit 115, and first ground element 116, as illustrated in FIG. 12.

First feedpoint 114 is a point to which a signal in a first frequency band is supplied. First feedpoint 114 has the same configuration as first feedpoint 14 according to the first exemplary embodiment.

As illustrated in FIG. 12, first element 111 is a conductive element disposed on first surface P1 and extending from first feedpoint 114 to third surface P3. In the present exemplary embodiment, first element 111 has a rectangular flat plate-like shape.

As illustrated in FIGS. 12 and 14, second element 112 is a conductive element disposed on third surface P3 and extending from an end of first element 111 along first surface P1. In the present exemplary embodiment, second element 112 has a rectangular flat plate-like shape. To a far end of second element 112, the far end being far from first element 111, first short-circuit element 113 is connected.

First short-circuit element 113 is a conductive element that short-circuits first antenna 110 and ground member 150. In the present exemplary embodiment, first short-circuit element 113 is disposed on first surface P1 and third surface P3, and connects a far end of second element 112, the far end being far from first element 111, to first ground element 116. First short-circuit element 113 short-circuits second element 112 of first antenna 110 and ground member 150 via first ground element 116. First short-circuit element 113 is disposed along first element 111 and second element 112. First slit 115 is disposed between first short-circuit element 113 and first element 111 and between first short-circuit element 113 and second element 112. As illustrated in FIG. 12, first short-circuit element 113 has an elongated portion disposed along first element 111 on first surface P1. As illustrated in FIG. 14, first short-circuit element 113 has an L-shaped portion disposed along second element 112 on third surface P3.

As illustrated in FIGS. 12 and 14, first slit 115 is a slit that separates first short-circuit element 113 from first element 111 and second element 112 of first antenna 110.

First ground element 116 is an element connected to ground member 150. First short-circuit element 113 is connected to first ground element 116. The configuration in which first ground element 116 is connected to ground member 150 is not limited to a particular configuration. In the present exemplary embodiment, first ground element 116 is connected and fixed to ground member 150 by being held between conductive screw 118 screwed into a screw hole provided in ground member 150, and ground member 150.

Second antenna 120 is an antenna disposed on second surface P2, and includes second feedpoint 124, antenna element 121, second short-circuit element 123, second slit 125, and second ground element 126, as illustrated in FIG. 13.

Second feedpoint 124 is a point to which a signal in the second frequency band is supplied. Second feedpoint 124 has the same configuration as second feedpoint 24 according to the first exemplary embodiment.

As illustrated in FIG. 13, antenna element 121 is a conductive element disposed on second surface P2 and extending from second feedpoint 124. In the present exemplary embodiment, antenna element 121 extends from second feedpoint 124 along third surface P3. Antenna element 121 has a rectangular flat plate-like shape. To a far end of antenna element 121, the far end being far from second feedpoint 124, second short-circuit element 123 is connected.

Second short-circuit element 123 is a conductive element that short-circuits second antenna 120 and ground member 150. In the present exemplary embodiment, second short-circuit element 123 is disposed on second surface P2, and connects a far end of antenna element 121, the far end being far from second feedpoint 124, to second ground element 126. Second short-circuit element 123 short-circuits antenna element 121 of second antenna 120 and ground member 150 via second ground element 126. Second short-circuit element 123 is disposed along antenna element 121. Second slit 125 is disposed between second short-circuit element 123 and antenna element 121. As illustrated in FIG. 13, second short-circuit element 123 has an elongated portion disposed along antenna element 121 on second surface P2.

As illustrated in FIG. 13, second slit 125 separates second short-circuit element 123 from antenna element 121 of second antenna 120.

Second ground element 126 is an element connected to ground member 150. To second ground element 126, second short-circuit element 123 is connected. The configuration in which second ground element 126 is connected to ground member 150 is not limited to a particular configuration. In the present exemplary embodiment, second ground element 126 is connected and fixed to ground member 150 by being held between conductive screw 128 screwed into a screw hole provided in ground member 150, and ground member 150.

Ground line 130 is a conductive element to be grounded, and is disposed on first surface P1 as illustrated in FIG. 11. Ground line 130 includes, as illustrated in FIG. 12, ground point 134 and ground line element 131.

Ground point 134 is a point to be grounded by being connected to ground member 150.

Ground line element 131 is a conductive element that is connected to ground point 134, includes a portion extending in a direction along first antenna 110, and is capacitively coupled to first antenna 110. In the present exemplary embodiment, ground line element 131 has an L shape. Specifically, ground line element 131 includes one portion extending from ground point 134 in a direction intersecting with third surface P3, and another portion extending from a far end of the one portion, the far end being far from ground point 134, along third surface P3. In the present exemplary embodiment, among the portions of ground line element 131, the portion extending from ground point 134 in the direction intersecting with third surface P3 extends from ground point 134 in a direction perpendicular to third surface P3.

Among the portions of ground line element 131, at least the part extending along third surface P3 extends in a direction along second element 112 of first antenna 110. In this manner, ground line element 131 is capacitively coupled to first antenna 110. More specifically, among the portions of ground line element 131, at least a part of the portion extending along third surface P3 extends in a direction along a portion including an open end of second element 112 of first antenna 110. In this manner, ground line element 131 can be capacitively coupled to second element 112 reliably.

Furthermore, a distance between the portion of ground line element 131 extending in the direction along second element 112 and second element 112 is less than or equal to 1/100 of a wavelength corresponding to a resonance frequency band of first antenna 110. In this manner, ground line element 131 can be capacitively coupled to first antenna 110 reliably. Because ground line 130 is connected to ground member 150, first antenna 110, ground member 150, and ground line 130 together form a loop antenna.

In the present exemplary embodiment, ground line 130 is disposed at a position facing second antenna 120. In addition, ground line element 131 includes a portion extending along the direction in which antenna element 121 of second antenna 120 extends. Specifically, ground line element 131 includes a portion extending along third surface P3.

The configuration in which ground line 130 is connected to ground member 150 is not limited to a particular configuration. In the present exemplary embodiment, ground line 130 is connected and fixed to ground member 150 by being held between conductive screw 138 screwed into a screw hole provided in ground member 150, and ground member 150.

The antenna device 101 according to the present exemplary embodiment also achieves the same action and effects as those achieved by the antenna device 1 according to the first exemplary embodiment. Furthermore, because communication terminal 102 according to the present exemplary embodiment includes antenna device 101, the same effects as those achieved by antenna device 101 can be achieved.

(Modifications and Others)

The present disclosure has been explained above on the basis of the exemplary embodiments. However, the present disclosure is not limited to the above exemplary embodiments. Various modifications made on the above exemplary embodiments by those skilled in the art may be included in the present disclosure, as long as such modifications fall within the scope not departing from the spirit of the present disclosure.

For example, in each of the above exemplary embodiments, the ground line is disposed only on first surface P1, but the ground line may also be disposed on third surface P3.

In addition, the shape of any of the antenna elements included in the antenna device according to any one of the exemplary embodiments described above is not limited to that explained above in the exemplary embodiment. Any of such elements may have an elliptical shape or may be curved.

For example, a meander structure may be used for a part of the elements included in the antenna device according to any one of the exemplary embodiments.

In the second exemplary embodiment, the example in which antenna device 101 is applied to a tablet terminal has been explained, but the antenna device according to each of the exemplary embodiments may be applied to any terminal other than the tablet terminal. For example, the antenna device according to each of the exemplary embodiments may also be applied to another type of communication terminal, such as a laptop personal computer (PC) or a smartphone.

In addition, any configuration achieved by any combination of the components and the functions in the exemplary embodiments within the scope not departing from the gist of the present disclosure also falls within the scope of the present disclosure.

The antenna device according to the present disclosure includes two antennas, and can be used in a communication terminal, such as a tablet terminal, a notebook PC, or a smartphone, as an antenna device capable of achieving a reduction in size while ensuring isolation between the two antennas.

What is claimed is:

1. An antenna device disposed on a first surface, a second surface parallel with the first surface, and a third surface connecting the first surface and the second surface and perpendicular to the first surface and to the second surface, the antenna device comprising:

a first antenna disposed on the first surface and the third surface;

a second antenna disposed on the second surface; and a ground line disposed on the first surface, wherein the first antenna includes:

a first feedpoint disposed on the first surface;

a first element, the first element being conductive, being disposed on the first surface, and extending from the first feedpoint to the third surface; and a second element, the second element being conductive, being disposed on the third surface, and extending in a direction along the first surface from an end of the first element, the second antenna includes:

a second feedpoint disposed in a manner separated from the first feedpoint in a direction parallel with the first surface and the second surface; and an antenna element, the antenna element being conductive and extending from the second feedpoint, and the ground line includes:

a ground point grounded; and a ground line element, the ground line element being conductive, being connected to the ground point, including a portion extending in a direction along the first antenna, and being capacitively coupled to the first antenna, wherein the portion of the ground line element, the portion extending in the direction along the first antenna, includes a portion extending in a direction along the second element, a distance between the portion extending in the direction along the second element and the second element is less than or equal to 1/100 of a wavelength corresponding to a resonance frequency band of the first antenna, and the ground point is connected to a ground member grounded, and a loop antenna is formed by the first antenna, the ground line element, and the ground member.

2. The antenna device according to Claim 1, wherein an electrical length of the loop antenna is 3/8 of the wavelength corresponding to the resonance frequency band of the first antenna.

3. The antenna device according to claim 1, wherein the ground line is disposed at a position facing the second antenna.

4. The antenna device according to claim 1, wherein an electrical length of the ground line element is 1/4 of a wavelength corresponding to a resonance frequency band of the second antenna.

5. The antenna device according to claim 1, wherein the ground line element includes a portion extending in a direction along a portion including an open end of the second element.

6. The antenna device according to claim 5, wherein, in the portion of the ground line element, the portion extending in the direction along the portion including the open end of the second element, a direction from a near end of the ground line element to an open end of the ground line element is reversal of a direction from a connected end of the second element to the open end of the second element, with the near end being near the ground point, and the connected end being connected to the first element.

7. The antenna device according to claim 1, wherein a distance between the first surface and the second surface is less than or equal to 1/10 of a wavelength corresponding to a resonance frequency band of the first antenna.

* * * * *